United States Patent [19]

Copelin

[11] 4,240,933

[45] Dec. 23, 1980

[54] Pd/SiO$_2$ HYDROGENATION CATALYST SUITABLE FOR H$_2$O$_2$ MANUFACTURE

[75] Inventor: Harry B. Copelin, Wilmington, Del.

[73] Assignee: E. I. Du Pont de Nemours and Company, Wilmington, Del.

[21] Appl. No.: 15,208

[22] Filed: Feb. 26, 1979

Related U.S. Application Data

[63] Continuation-in-part of Ser. No. 948,036, Oct. 2, 1978, abandoned.

[51] Int. Cl.$^2$ .......................... B01J 29/06; B01J 29/12
[52] U.S. Cl. ................................. 252/455 R; 252/460
[58] Field of Search ........................... 252/455 R, 460; 423/588

[56] References Cited

U.S. PATENT DOCUMENTS

| | | | |
|---|---|---|---|
| 2,496,265 | 2/1950 | Billisoly | 260/449.6 |
| 2,914,382 | 11/1959 | Holmes et al. | 423/588 |
| 3,030,186 | 4/1962 | Kreuz et al. | 423/588 |
| 3,271,327 | 9/1966 | McEvoy et al. | 423/588 |
| 3,629,145 | 12/1971 | Morikawa et al. | 252/432 |
| 3,684,742 | 8/1972 | Pollitzer | 252/455 R |
| 3,909,452 | 9/1975 | Acres | 252/455 R |

*Primary Examiner*—Carl F. Dees

[57] ABSTRACT

An amorphous silica supported palladium catalyst is provided which also contains a small amount of an additive metal compound selected from an oxide, hydroxide and carbonate of zirconium, thorium, hafnium, cerium, titanium and aluminum. By use of particular preparation conditions and the amount of additive metal salt raw material used, the additive metal compound deposits from solution before or simultaneously with a palladium compound. The additive metal compound deposits on the silica support and serves as a base for the subsequently deposited palladium compound which is later reduced to palladium metal. The described catalyst is particularly suitable as a hydrogenation catalyst in a cyclic process for the manufacture of hydrogen peroxide.

16 Claims, No Drawings

Pd/SiO$_2$ HYDROGENATION CATALYST SUITABLE FOR H$_2$O$_2$ MANUFACTURE

CROSS-REFERENCE TO RELATED APPLICATION

This application is a continuation-in-part of copending application Ser. No. 948,036, filed Oct. 2, 1978 and now abandoned.

DESCRIPTION

1. Technical Field

This invention relates to silica supported palladium catalysts, their preparation and use in catalytic hydrogenations of alkylanthraquinones, particularly in cyclic processes for the production of hydrogen peroxide.

2. Background Art

The anthraquinone process for hydrogen peroxide manufacture employs a cyclic operation in which an anthraquinone is catalytically hydrogenated in solution to a hydroquinone which is then air oxidized to regenerate the quinone and produce hydrogen peroxide. The hydrogen peroxide is separated from the quinone solution by water extraction, and the raffinate is returned to be hydrogenated.

Palladium is the catalyst of choice for the hydrogenation. It has been commercial practice to use palladium black or palladium on various supports, with a commonly used support being gamma alumina as described in U.S. Pat. No. 2,657,980, issued Nov. 3, 1953, to J. W. Sprauer. While this catalyst has the advantage of easy preparation and allows catalyst regeneration by roasting, it has as disadvantages water sensitivity (see U.S. Pat. 2,867,507) and fairly rapid deactivation under reaction conditions.

A more inert material suitable as a support for palladium is silica gel. However, past attempts to produce active and long-lived palladium on silica gel catalysts by slurry techniques, as are used with aluminas, probably failed because the PdCl$_4$= anion is not appreciably absorbed by the silica gel, and when precipitated and reduced provided only minor amounts of palladium metal attached to the support. Large amounts of free palladium apparently were formed as indicated by the low activity of the supported catalyst as stated in U.S Pat. No. 2,657,980 (column 2, line 39).

Various attempts have been made to prepare acceptable pd/SiO$_2$ hydrogenation catalysts for use in preparing hydrogen peroxide. In U.S. Pat. No. 2,940,833, issued June 14, 1960, to LeFeuvre et al, a silica gel support was pretreated with sodium bicarbonate prior to impregnation with Na$_2$PdCl$_4$. In UK Specification No. 776,991, insoluble magnesium compounds were precipitated on the silica gel prior to impregnation with Na$_2$PdCl$_4$. None of these procedures is known to have produced commercially acceptable catalysts.

DISCLOSURE OF THE INVENTION

According to the present invention there is provided a catalyst consisting essentially of: amorphous silica particles having deposited thereon about 0.05–5 percent by weight based on the weight of silica of at least one oxide, hydroxide or carbonate of a metal selected from zirconium, thorium, hafnium, cerium, titanium, and aluminum and about 0.1–10 percent by weight based on the weight of silica of palladium metal; the metal oxide, hydroxide or carbonate being deposited before or simultaneously with the palladium metal in the form of its oxide, hydroxide or carbonate.

Also provided is a process for preparing a supported palladium catalyst comprising: (1) mixing a water-soluble, palladium salt, amorphous silica particles and at least one water-soluble salt of a metal selected from zirconium, thorium, hafnium, cerium, titanium, and aluminum in an aqueous medium at a pH less than 4, the amount of said metal salt being sufficient to cause at least a major portion of the palladium present in solution to attach to the surface of the amorphous silica particles when the palladium salt is subsequently precipitated as an oxide, hydroxide or carbonate of palladium by the addition of base; (2) adding a base to said mixture raising the pH of the aqueous medium to above about 4 causing the metal and palladium to deposit onto the silica particles as their hydroxides, oxides or carbonates and (3) optionally reducing the deposited palladium hydroxide, oxide or carbonate to palladium metal.

The present invention also provides in a process for producing hydrogen peroxide by alternately hydrogenating an alkylanthraquinone and oxygenating the resulting alkylanthrahydroquinone to regenerate the alkylanthraquinone and to produce hydrogen peroxide, the improvement comprising: hydrogenating an alkylanthraquinone in the presence of a catalyst consisting essentially of an amorphous silica support having deposited thereon (1) an oxide, hydroxide or carbonate of at least one metal selected from zirconium, thorium, hafnium, cerium, titanium, and aluminum and (2) palladium metal.

The silica supported palladium catalyst of the present invention, which incorporates at least one metal hydroxide, oxide or carbonate of zirconium, thorium, hafnium, cerium, titanium and aluminum, possesses good activity and long life for the hydrogenation step of the anthraquinone process for the manufacture of hydrogen peroxide. Such a catalyst has minimized water sensitivity and minimizes degradation of the anthraquinones.

The catalyst of the invention is prepared by adding a water-soluble palladium salt, such as chloropalladic acid or sodium chloropalladite, and a water-soluble metal salt of a metal selected from zirconium, thorium, hafnium, cerium, titanium and aluminum to an aqueous acidic slurry of amorphous silica particles. The important consideration in the preparation is not to have the palladium precipitated, by the addition of base, as its oxide, hydroxide or carbonate prior to the precipitation of an oxide, hydroxide or carbonate of the aforesaid metals.

Amorphous silica particles are used as the catalyst support. The most readily available amorphous silica is silica gel which is a gelatinous activated form of silica typically pulverized to a fine powder. While particle size does not appear to be critical to the present invention, silica gel particles will typically have an average mean particle size in the range of about 10–300 microns, preferably about 50–200 microns. The surface area of these particles is generally in the range of about 20–600 m$^2$/g, preferably about 100–350 m$^2$/g. Coarser particles are easier to filter than fine particles; thus, for slurry hydrogenation processes, a more coarse silica gel can also be used, e.g., particles of up to a mean diameter about 1 mm are acceptable. The invention is not restricted to these particle sizes as it is possible to use catalyst in a more coarse form for fixed bed hydrogenations where anthraquinone working solution and hydrogen are passed through the bed either cocurrently or counter-currently.

Another useful amorphous silica support results from spray drying of a colloidal silica sol as described in coassigned application Ser. No. 817,060, filed on July 19, 1977, in the names of Horatio Bergna and Jack J. Kirkland. As described therein, such silica particles consist of aggregates of micrograins having a dense packing such that the porosity is less than 45 percent by volume. They may be further defined as based on a dispersion of amorphous silica, the ultimate particles having a mean diameter of from 5-80 nm.

In preparing the catalysts, the powdered or granular amorphous silica is slurried in water. Optionally, the silica particles can be pretreated with acid (e.g., 1-10 percent nitric acid, acidified hydrogen peroxide or equivalent) to remove surface iron and other impurities which are deleterious to a hydrogen peroxide process. The slurry concentration is not critical. It should be thin enough to allow a reasonable amount of agitation, but not so dilute so as to require handling of large amounts of liquid for small amounts of catalyst. Ordinarily, a silica concentration of about 5-30 percent by weight of the slurry is satisfactory with about 15-20 percent being a typical, preferred concentration.

To the amorphous silica slurry is added desired amounts of a water-soluble palladium salt and an additive which is a water-soluble salt of a metal selected from thorium, hafnium, zirconium, cerium, titanium and aluminum. The metal salt additive can be added prior to, together with, or after the palladium salt. Any water-soluble palladium salt can be used; however, $Na_2PdCl_4$ and a solution (preferably at pH 1.5-3) of $H_2PdCl_4$ in dilute HCl are preferred. The palladium salt is added in an amount to provide about 0.1-10 percent by weight of palladium metal in the final catalyst, based on the weight of silica, preferably about 0.2-5 percent. Examples of other water-soluble palladium salts are the nitrates, sulfates and alkali metal bromopalladites.

Typical water-soluble metal salts are the nitrates, halides (chlorides, bromides, iodides), oxyhalides (oxychlorides, oxybromides, oxyiodides) and sulfates; preferably nitrates, chlorides and oxychlorides.

The water-soluble metal salt is added in an amount that is sufficient to cause at least a major portion of the palladium persent in solution to attach to the surface of the amorphous silica particles when the palladium in solution is subsequently precipitated as an oxide, hydroxide or carbonate of palladium. In order to efficiently utilize the palladium in solution, the water-soluble metal salt is preferably added in an amount that is sufficient to cause substantially all of the palladium in solution to attach to the surface of the silica when precipitated. The amount used varies from additive metal to metal, from salt to salt and depends upon the specific amorphous silica support used. If insufficient metal additive salt is used, there will be insufficient metal additive oxide, hydroxide or carbonate deposited on the support to promote the adhesion of the subsequently deposited oxide, hydroxide or carbonate of palladium and, thus, of the final reduced palladium metal. In this case, the catalyst will have low activity since some palladium will be precipitated in the solution free of the support and lost. If too much metal additive salt is used, free metal additive oxide, hydroxide or carbonate will form free of the support. In this case, some palladium oxide, hydroxide or carbonate will attach to this free metal additive oxide, hydroxide or carbonate and not to that attached to the support. Here again, some palladium is lost due to its not being attached to the support.

The slurry at this point should have a pH less than about 4, typically about 2-3, which is then preferably heated to a temperature in the range of about 50°-150° C. and most preferably about 75°-100° C. If desired, the amorphous silica slurry can be heated prior to the addition of the palladium salt and water-soluble metal salt. Once the desired temperature is reached, a slow to moderate addition rate of base is begun to precipitate palladium and the metal of the salt as their oxides, hydroxides and/or carbonates. Addition of base is gradual in order to give the additive metal compound a chance to deposit on the silica surface prior to deposition of the palladium compound. Palladium generally precipitates at a higher pH than the additive metals. The base can be any material which will raise the pH of the slurry to 4.0 or above; however, an alkali metal carbonate such as sodium or potassium carbonate is preferred. The final pH can be in the range of 4-10 or higher, but a preferred range is pH 5-8. The time required to reach the final pH can be from 1 minute to 30 minutes or longer, but the preferred addition period is from 5-20 minutes. Other bases which can be used are hydroxides and bicarbonates of metals of Groups 1 and 2 of the Periodic Table of Elements. Organic bases such as quaternary ammonium hydroxides can also be used.

When the final desired pH is reached and the metal compounds have deposited on the amorphous silica particles, a reducing agent such as formaldehyde is added, usually in excess, to completely reduce the palladium compound to palladium metal. The additive metal oxide, hydroxide or carbonate is not reduced. This reduction generally requires about 5-20 minutes at the preferred 75°-100° C. temperature. If desired, the catalyst can be separated, washed and dried prior to the final reduction to palladium metal, which can be done later, e.g., in situ using hydrogen or other reducing agent. No particular advantage is seen in this procedure. After the palladium is reduced, the catalyst is filtered, washed to remove soluble salts and dried. Drying in a vacuum dryer at 130°-140° C. is effective, but any normal drying procedure is satisfactory. Formaldehyde is the preferred reducing agent, but any other known reducing agent can be used usch as hydrogen, hydrazine and sodium borohydride.

While the above procedure is preferred, the additive metal compound can be incorporated into the silica gel prior to dehydration or precipitated onto the amorphous silica particles prior to contacting the particles with the palladium salt solution. If the latter procedure is used, care must be taken to adjust the pH of the palladium solution to a range that will not permit resolution of the precipitated additive metal compound, e.g., about pH 3.5-4.0. Separate impregnation of the silica support with additive metal compound has one advantage, i.e., an excess of the initial additive metal salt can be employed to guarantee saturation of the support, which is desirable in attaining maximum palladium utilization. The excess, unabsorbed additive metal precipitate can then be removed by elutriation or selective filtration.

The described alternative procedures are not necessary, however, if the correct amount of additive metal salt is used as described earlier. This correct amount is important because, if too much is used, there will be a coprecipitation of additive metal compound and palladium compound upon the addition of base which is separate from the silica support, thus resulting in lost metal. If too little is used, the effectiveness of the resulting catalyst is reduced since, particularly at higher palladium concentrations, some of the palladium will not be attached to the silica support. To ascertain whether the correct amount of additive metal salt has been employed, the final catalyst can be examined visually under a microscope. A proper catalyst is uniform in color, i.e., the silica has darkened to a uniform gray to brownish color, indicating no free palladium metal. The use of too little or too much additive metal salt is manifested by the presence of black, dense particles of free palladium metal or agglomerates of palladium metal. Evidence of the use of too much additive is also shown by examination of filtrate during washing of the catalyst. A nonclear filtrate (darkened in color) shows that unattached palladium metal precipitated in solution is coming through the filter.

The optimal amount of additive metal salt is somewhat controlled by the nature of the silica support and particle size distribution. However, the amount used will generally be in the range of about 0.05–5 percent by weight, based on the weight of silica, preferably about 0.1–2 percent by weight. When using Davison 56, a commercial grade of powdered silica gel having a surface area of 300 m$^2$/g, useful and optimum ( ) quantities of preferred additive metal salts are:

Zirconium [as $ZrOCl_2.8H_2O$] 0.3–1% (0.5–0.6%)
Thorium [as $Th(NO_3)_4.4H_2$] 0.5–1.5% (0.8–1.0%)
Titanium [as $TiCl_4$] 0.2–0.8% (0.3–0.4%)
Cerium [as $Ce(NO_3)_4.6H_2O$] 0.4–1.5% (0.7–0.9%)
Aluminum [as a solution of aluminum chlorhydroxide equivalent to 30% $Al_2O_3$] 0.3–1.4% (0.6–0.8%)

Catalysts consisting essentially of an amorphous silica support having deposited thereon (1) an oxide, hydroxide or carbonate of at least one metal selected from zirconium, thorium, hafnium, cerium, titanium and aluminum and (2) palladium metal, particularly the catalysts prepared according to the present invention, are particularly useful as hydrogenation catalysts in the hydrogenation stage of a process to prepare hydrogen peroxide involving the cyclic reduction and oxidation of alkylanthraquinones. Such a process is well known in the art and is described in detail in U.S. Pat. Nos. 2,657,980; 2,867,507 and 2,940,833, the disclosures of which with respect to the hydrogenation stage and useful alkylanthraquinones are hereby incorporated by reference. As mentioned earlier, the catalysts are suitable for use in free suspension in a hydrogenator when the catalysts are of such a particle size that separation from the anthraquinone working solution can be achieved simply by filtration. Catalysts of larger particle sizes can be used in a fixed bed hydrogenator.

The invention can be further understood by the following examples in which parts and percentages are by weight unless otherwise indicated.

In the examples which follow, catalyst activity was tested by a rate test in which hydrogen uptake of a solution of mixed 2-alkylanthraquinones and 2-alkyltetrahydroanthraquinones in a solvent of diisobutyl carbinol and mixed alkylaromatics in contact with a small amount of catalyst was measured. The procedure followed for the rate test was as follows:

To a 100 ml round bottom flask was added 0.1000 g ± 0.0005 g of silica supported catalyst and 10 ml of a diluted working solution. The working solution was composed of about 63% solvent [22% diisobutyl carbinol (DIBC) and 41% Cyclosol® 63[1]]; about 25% quinones (4% tetrahydro-2-t-butylanthraquinone, 2% 2-t-butylanthraquinone, 11.5% tetrahydroamylanthraquinone and 7.5% amylanthraquinone) and about 12% inerts, i.e., epoxide, anthrone and other working solution byproducts. The diluted working solution was prepared by combining 1 part by volume working solution, which has been completely oxidized and water extracted, with 4 parts by volume solvent (60/40 by volume, xylene/DIBC which is water saturated). A ½" Teflon® coated magnetic stirring bar was added and the flask sealed with a vacuum stopcock. The flask was then placed on a constant pressure hydrogenation apparatus in which mercury in a reservoir bulb and a buret acted as a moving piston that kept the hydrogen pressure in the reaction flask at atmospheric, i.e., as hydrogen was consumed and the pressure dropped, mercury rose in the buret to increase hydrogen pressure. Hydrogen pressure was automatically readjusted by the use of nitrogen gas pressure to move the column of mercury. Nitrogen gas was fed in response to a relay actuated solenoid value. The hydrogen uptake was a function of the difference in the heights of the mercury levels in the reservoir and buret. Thus, when initially calibrated, the buret's mercury level accurately records the volume of hydrogen used with time.
[1] Cyclosol®63 is a high boiling complex mixture of primarily aromatic hydrocarbons.

The flask was evacuated and filled with hydrogen three times; it was allowed to equilibrate 10 minutes and then the magnetic stirrer started. The hydrogen uptake (in ml) was plotted vs. time (in minutes) on a linear graph. The graph shows an initial portion that plots as a straight line (after the reduction has been running a short time and before it starts to slow down about one-half way through.) The slope of this straight portion is taken as the hydrogen uptake rate in ml/min.

EXAMPLE 1

One hundred grams of Davison 56 silica gel[1] was slurried in 500 cc of 5% nitric acid and heated to 80° C. It was then cooled, filtered, and washed with distilled water. The wet cake was reslurried in 500 cc of distilled water, and to the slurry was added 50 cc of a solution containing 2 g of $PdCl_2$ and 2 g of NaCl water to which 1 g of thorium nitrate tetrahydrate had been added. The temperature of the slurry was raised to 80° C. with stirring after which a saturated potassium carbonate solution was then added dropwise until a pH of 8 was reached. At this point, 15 cc of 37% formaldehyde solution was added. After continuing to stir at 80° C. for 15 minutes, the slurry was filtered, washed with 500 cc of water, sucked dry and then placed in a vacuum oven at 130°–140° C. for 3 hours. Catalyst activity was tested as described and the results are shown in Table I.
[1] Powdered silica gel having a surface area of 300 m$^2$/g.

EXAMPLE 2 (Best Mode)

Sixty-five grams of Davison 56 silica gel was heated to a boil with 5% nitric acid, cooled, filtered and washed with distilled water. The wet filter cake was reslurried in 300 cc distilled water to which was then added 31 g of a solution of $PdCl_2$ in dilute hydrochloric acid (2.5% Pd) which had been brought to pH of 3 by addition of sodium carbonate. To this slurry was added 2.4 cc of 0.5 molar aqueous zirconium nitrate. The temperature was raised to 85° C. and saturated sodium carbonate solution was added dropwise until a pH of 7.0 was reached. Ten cc of 37% formaldehyde was then added and the slurry stirred for 10 minutes. The catalyst was then filtered, washed and dried as above. The results of catalyst activity testing are shown in Table I.

EXAMPLE 3

One hundred grams of acid washed Davison 56 silica gel was slurried in 500 cc of distilled water. To the slurry was added a 50 cc solution containing 1.2 g of palladium dissolved in dilute HCl which solution had been brought to a pH of 2.0 with $Na_2CO_3$. Also added 10 ml of a dilute HCl solution containing 0.34 g $TiCl_4$. The temperature was raised to 75°–80° C. with stirring and a saturated aqueous sodium carbonate solution was added dropwise to a pH of 7.0. Added 25 cc of 37% formaldehyde and maintained the temperature for 15 minutes. The catalyst was filtered, washed and dried as above. The results of catalyst activity testing are shown in Table I.

EXAMPLE 4

A sample of colloidal silica was spray-dried to yield a 100–200 mesh (U.S. sieve) (powder 74–147 microns) of a surface area of 100 $m^2/g$. One hundred grams of this material was slurried in 400 g of water and allowed to stand overnight. One gram of thorium nitrate tetrahydrate was added and $Na_2PdCl_4$ equivalent to 2 g $PdCl_2$ was also added. The slurry was heated to 90° C. with stirring for 20 minutes. An aqueous solution of saturated potassium carbonate was then added dropwise until a pH of 7.5 was reached. Twenty cc of 37% aqueous formaldehyde was then added and the pH was gradually raised to 9.0 over 5 minutes. The slurry was filtered, washed with distilled water and dried as in Example 1. Catalyst activity was tested as described and the results are shown in Table I.

EXAMPLE 5

Example 1 was repeated except only 1 g of $PdCl_2$ was used. Catalyst activity results are shown in Table I.

EXAMPLE 6

Example 1 was repeated except 5 g Pd as a $H_2PdCl_4$ solution which had been adjusted to ph=3.0 by addition of sodium carbonate was used. Catalyst activity results are shown in Table I.

EXAMPLE 7

One hundred two cc of aqueous zirconium nitrate solution containing 3.9 g Zr as $ZrO_2$ was mixed with 510 g of Ludox ® AS 40, a commercial colloidal silica containing 40% $SiO_2$. The resulting solution was spray dried, yielding a powder which was screened to remove particles larger than 106 microns. This material contained zirconium equivalent to 1.86% as $ZrO_2$. (Note that the Ludox ® AS 40 was sufficiently alkaline to precipitate the zirconium as the oxide.) Twenty-five grams of the spray-dried $SiO_2$ was slurried 4× with water and the supernatant liquor decanted to eliminate fines. Then 10 ml of a 2.5% palladium solution in dilute HCl was added. The temperature was raised and at 51° C. the pH was increased to 3.0 by the addition of an aqueous saturated potassium carbonate solution. At 72° C. the pH was increased to 3.8 and at 88° C. to 4.0. Added 5 cc of 37% aqueous formaldehyde while maintaining the pH at 4.0. When the pH was stable at 4.0 (5–10 min.), the catalyst was filtered, washed with water and dried as before. The activity of the catalyst was tested as described and the results are shown in Table I.

EXAMPLE 8

By a procedure similar to Example 7, a sample of spray-dried Ludox ® AS 40 containing 2.85% zirconium as $ZrO_2$ was obtained. The particle size was 106–250 microns. Fifty grams of this material was washed 4× with water by decantation to remove excess $ZrO_2$, then was slurried in 200 cc of water to which was added 20 ml of a 2.5% Pd in dilute HCl, pH 1.9 and heated to 88° C. The pH was slowly increased over 80 minutes to 5.0 by the addition of sodium carbonate solution. Then added 10 cc of 37% formaldehyde and maintained pH at 5.0 until no further drift occurred, about 10 minutes. The catalyst was then filtered, washed and dried. Catalyst activity was tested and the results are shown in Table I.

EXAMPLE 9

Two hundred grams of Davison 56 silica gel was slurried in 800 cc of 10% nitric acid and the slurry heated to 90° C., then cooled. The supernatant liquid was removed and the silica washed 4× by decantation using 1 liter of water per wash. It was finally slurried in 1 liter of water with 14.5 g of Zr $(NO_3)_4$ solution equivalent to 2.9 g $ZrO_2$. Adjusted pH to 7.0 with saturated KOH solution, then washed 4× with 1 liter of water by decantation to remove any excess zirconium hydroxide, filtered and sucked dry. Wet cake, containing 25 g of treated silica gel, was reslurried in 200 cc of distilled water. Separately 12.5 cc of a 2.5% Pd in HCl solution was adjusted to a pH of 4.7 at room temperature by the addition of potassium carbonate solution and the solution added to the silica gel slurry. Heating was started, and continued until the slurry reached 85° C. A saturated potassium carbonate solution was added as necessary to maintain the pH above 4.0. Added 10 cc of 37% formaldehyde solution and maintained the pH at 4.0 until no further tendency to drop was observed. The catalyst was filtered, washed and dried as before. Catalyst activity was tested and the results are shown in Table I.

EXAMPLE 10

Example 9 was repeated except using 12 cc of a solution of sodium chloropalladite containing 2.5% palladium. The slurry pH was raised to 7.0 when the temperature reached 85° C. and maintained at 7.0 during the reduction. Catalyst activity results are shown in Table I.

EXAMPLE 11

Twenty-five grams of spray-dried colloidal silica as in Example 4 was added to 100 cc of distilled water containing 1.8 g of cerium nitrate hexahydrate. The pH was raised to 7.0 by the addition of potassium hydroxide solution. After stirring for a few minutes, the treated silica was washed 4× by decantation to remove fines and excess cerous hydroxide, then filtered and washed with water. The damp cake was transferred to a beaker containing 200 cc of distilled water. To the resulting slurry was added 10 g of a solution of $H_2PdCl_4$ (containing 0.25 g Pd), after which the pH was raised to 5.8 with a KOH solution. The pH of the slurry was maintained at 5.8 while heating to 83° C., at which point the pH was raised to 7.0 with a KOH solution and then 5 cc of 37% formaldehyde solution added. After 10 minutes, the slurry was filtered, washed with water and the resulting catalyst dried in a vacuum oven as before. The activity of the catalyst was tested as described and the results are shown in Table I.

EXAMPLE 12

Forty-one grams of Davison 56 silica gel particles, which had been treated for one hour at room temperature with an acidified (to pH=4.0) sodium oxalate solution followed by filtering and washing with water, was slurried in 200 cc of distilled water. To this was added 20 g of $H_2PdCl_4$ solution (0.5 g Pd) and 0.25 g of a 50% solution of aluminum chlorhydroxide containing the equivalent of 30.6% $Al_2O_3$. The pH was adjusted to 2 by the addition of a sodium carbonate solution and the slurry heated to 80° C. where the pH was gradually brought to 8.0 by the additon of sodium carbonate solution. After 10 cc of 37% aqueous formaldehyde solution were added, the slurry was held for 10 minutes at 75°–80° C. and then filtered, washed and dried as before. Catalyst activity was tested as described and the results are shown in Table I.

CONTROLS A AND B

A. As a control, a standard palladium on alumina catalyst was prepared as follows:

One hundred grams of powdered γ-alumina was slurried in 500 ml of distilled water. The mixture was sparged with carbon dioxide until the pH reached 6.0–6.3 at which time 24 g of a solution containing 2.5 percent palladium as $H_2PdCl_4$ was then added over a 30-minute period and the slurry stirred for an additional 15 minutes. The temperature was raised to 75° C., held for 15 minutes and 1 ml of 37% formaldehyde added, held for another 15 minutes after which the pH was raised to 7.8 by gradual addition of a saturated sodium carbonate solution. When the pH had stabilized, the slurry was cooled, filtered and washed with 3–100 cc portions of distilled water. The resulting catalyst was vacuum dried for 3 hours at 125° C. and then roasted at 450° C. for 3 hours.

B. A palladium on silica gel catalyst was prepared as in Example 2 but with the $Zr(NO_3)_4$ additive omitted.

Control catalysts A and B were tested for activity as described and the results are shown in Table I.

TABLE I

| Example No. | Pd (Calc. Wt %) | Additive Metal | Calc. Wt % (as oxide) | | $H_2$ Uptake (ml/min.) |
|---|---|---|---|---|---|
| 1 | 1.2 | Th | 0.48 | | |
| 2 | 1.2 | Zr | 0.23 | | 8.2 |
| 3 | 1.2 | Ti | 0.14 | | 7.0 |
| 4 | 1.2 | Th | 0.48 | | 8.2 |
| 5 | 0.6 | Th | 0.48 | | 4.9 |
| 6 | 5.0 | Th | 0.48 | | 10.4* |
| 7 | 1.0 | Zr | 1.86 | (excess) | 9.3 |
| 8 | 1.0 | Zr | 2.85 | (excess) | 7.9 |
| 9 | 1.2 | Zr | 1.45 | (excess) | 7.8 |
| 10 | 1.2 | Zr | 1.45 | (excess) | 9.0 |
| 11 | 1.0 | Ce | 3.8 | (excess) | 7.2 |
| 12 | 1.2 | Al | 0.19 | | 8.0 |
| Control A | 0.6 | — | — | | 2.0–2.5 |
| Control B | 1.2 | — | — | | 1.0 or less |

*$H_2$ transfer limited.

EXAMPLE 13

Life testing of a hydrogen peroxide hydrogenation catalyst was carried out in a bench scale cyclic unit where working solution was circulated through a hydrogenator, an oxidizer and an extractor. In the hydrogenator, a part of the quinone in the working solution was converted to hydroquinone. From the hydrogenator, the working solution passed to the oxidizer where it was contacted with air, hydrogen peroxide being formed and the quinone regenerated. After extraction with water, the working solution was returned to the hydrogenator. The reaction loop contained about 8.3 kg of working solution described previously. The working solution flow rate was 32 cc/min.

The hydrogenator consisted of a piece of glass pipe 18" (45.72 cm) long by 3" (7.62 cm) inside diameter. Feed of working solution to the hydrogenator was into a conical bottom section. The hydrogenating gas, a $H_2/N_2$ mixture ranging from about 50–70 volume % $H_2$, was fed at the bottom, sparged through two holes of about 0.025" (about 0.06 cm) at rate of about 1.5 liters per minute. Working solution was withdrawn through two candle filters, the volume of liquid in the reactor normally set at 1200 cc, being determined by the elevation of the filters. The hydrogenator agitator was a 2.38" (about 6 cm) diameter, pitched 3-bladed propeller belt drawn by an electric motor at 600 rpm. Three 0.5" (about 1.3 cm) wide baffles on the hydrogenator walls assured good mixing. The hydrogenator pressure was 15 psig and the temperature about 52° C.

Twenty-five grams of the $Pd/Th/SiO_2$ catalyst prepared as in Example 1 was charged to the hydrogenator as a slurry catalyst. The initial titer of the working solution in the hydrogenator was 40, and after 8 days of continuous operation, the titer remained at 40. At this point, the water content of the hydrogenator feed was allowed to go to saturation (0.45–0.5%) to determine the effect of water on the catalyst. The titer increased to about 42–43 and remained at that level until the cyclic unit was shut down after continuous operation for 12 days. The term titer means pound-moles of hydroquinone per 10,000 gallons of working solution.

As a control, 60 g of a standard $Pd/Al_2O_3$ catalyst prepared as in Control A was charged to the hydrogenator. The initial titer of the working solution in the hydrogenator was about 36. To maintain the titer at 36, incremental additions of control catalyst were made throughout a run of 12 days. During this period, about 120 g of control catalyst was added to maintain a titer of 36.

I claim:

1. A catalyst consisting essentially of amorphous silica particles having deposited thereon about 0.05–5 percent by weight based on the weight of silica of at least one oxide, hydroxide or carbonate of a metal selected from zirconium, thorium, hafnium, cerium, and titanium and about 0.1–10 percent by weight based on the weight of silica of palladium metal; the metal oxide, hydroxide or carbonate being deposited before or simultaneously with the palladium metal in the form of its oxide, hydroxide or carbonate.

2. The catalyst of claim 1 wherein the amorphous silica particles have a particle size in the range of about 10–300 microns and a surface area of about 20–600 $m^2/g$.

3. The catalyst of claim 1 or claim 2 wherein the metal oxide, hydroxide or carbonate concentration is about 0.1–2 percent by weight.

4. The catalyst of claim 1 or claim 2 wherein the palladium concentration is about 0.2–5 percent by weight and the amorphous silica particles are silica gel particles having an average particle size distribution in the range of about 50–200 microns and a surface area in the range of about 100–350 m$^2$/g.

5. A process for preparing a supported palladium catalyst comprising (1) mixing a water-soluble palladium salt, amorphous silica particles and at least one water-soluble salt of a metal selected from zirconium, thorium, hafnium, cerium, titanium and aluminum, in an aqueous medium at a pH less than 4, the amount of said metal salt being sufficient to cause at least a major portion of the palladium present in solution to attach to the surface of the amorphous silica particles when the palladium salt is subsequently precipitated as an oxide, hydroxide or carbonate of palladium by the addition of base; and (2) adding a base to said mixture raising the pH of the aqueous medium to above about 4 causing the metal and palladium to deposit onto the silica particles as their hydroxides, oxides or carbonates.

6. The process of claim 5 wherein the added base is an alkali metal carbonate, the temperature of addition is in the range of about 50–150° C., the pH is raised to pH 5–8 and the deposited palladium hydroxide, oxide or carbonate is reduced to palladium metal.

7. The process of claim 5 wherein the amorphous silica particles have an average particle size distribution in the range of about 100–300 microns and a surface area in the range of about 20–600 m$^2$/g.

8. The process of claim 5, claim 6 or claim 7 wherein the salt of zirconium, thorium, hafnium, cerium, titanium or aluminum is a nitrate, sulfate, halide or oxyhalide.

9. The process of claim 5 wherein the surface of the silica particles is iron-free.

10. The process of claim 5, claim 6 or claim 7 wherein the deposited palladium hydroxide, oxide or carbonate is reduced by adding to the mixture a reducing agent selected from the group consisting of hydrogen, formaldehyde, and hydrazine and the resulting catalyst is removed and washed with water.

11. The process of claim 5 or claim 6 wherein the amorphous silica particles are silica gel particles having a surface area of about 100–350 m$^2$/g and the metal salt is a nitrate, chloride or oxychloride added at a concentration of about 0.05–5 percent by weight of the silica gel.

12. A process for preparing a supported palladium catalyst comprising (1) adding to an aqueous slurry of about 5–30 percent by weight silica gel particles having an average particle size distribution in the range of about 10–300 microns and a surface area of about 20–600 m$^2$/g, about 0.1–10 percent by weight, based on silica, of Na$_2$PdCl$_4$ or PdCl$_2$ in dilute HCl and one of the following, based on the weight of silica:
  (a) about 0.3–1 percent zirconium oxychloride,
  (b) about 0.5–1.5 percent thorium nitrate,
  (c) about 0.2–0.8 percent titanium tetrachloride,
  (d) about 0.4–1.5 percent cerium nitrate hexahydrate, or
  (e) about 0.3–1.4 percent aluminum chlorhydroxide;
(2) heating the slurry to a temperature in the range of about 75°–100° C.; (3) gradually adding to the heated slurry an alkali metal carbonate in an amount sufficient to raise the slurry pH to a pH in the range of about 5–8; and (4) adding formaldehyde in an amount sufficient to reduce the palladium content to palladium metal.

13. The process of claim 12 wherein the alkali metal carbonate is at least one of sodium carbonate and potassium carbonate.

14. The process of claim 12 wherein the silica gel particles have a surface area in the range of about 100–350 m$^2$g.

15. The process of claim 12 or claim 14 wherein the palladium added is PdCl$_2$ in dilute HCl at a pH of about 1.5–2.5.

16. The process of claim 12 wherein the concentration of (a), (b), (c), (d) or (e) is: (a) about 0.5–0.6 percent, (b) about 0.8–1 percent, (c) about 0.3–0.4 percent, (d) about 0.7–0.9 percent or (e) about 0.6–0.8 percent.

* * * * *